US008200618B2

(12) United States Patent
Gibson et al.

(10) Patent No.: US 8,200,618 B2
(45) Date of Patent: Jun. 12, 2012

(54) SYSTEM AND METHOD FOR ANALYZING DATA IN A REPORT

(75) Inventors: Stephen David Gibson, Kemptville (CA); Andrew Alexander Leikucs, Ottawa (CA); Stewart James Winter, Metcalfe (CA)

(73) Assignee: International Business Machines Corporation, Armonk, NY (US)

(*) Notice: Subject to any disclaimer, the term of this patent is extended or adjusted under 35 U.S.C. 154(b) by 579 days.

(21) Appl. No.: 11/934,553

(22) Filed: Nov. 2, 2007

(65) Prior Publication Data

US 2009/0119309 A1 May 7, 2009

(51) Int. Cl.
*G06F 7/00* (2006.01)
*G06F 17/00* (2006.01)

(52) U.S. Cl. ........................ 707/603; 707/790; 707/802

(58) Field of Classification Search ........................ None
See application file for complete search history.

(56) References Cited

U.S. PATENT DOCUMENTS

| | | | | |
|---|---|---|---|---|
| 5,915,257 | A * | 6/1999 | Gartung et al. | 715/210 |
| 6,028,997 | A * | 2/2000 | Leymann et al. | 717/104 |
| 6,321,241 | B1 * | 11/2001 | Gartung et al. | 715/210 |
| 6,609,123 | B1 * | 8/2003 | Cazemier et al. | 1/1 |
| 7,177,843 | B2 * | 2/2007 | Nguyen et al. | 705/51 |
| 7,181,450 | B2 * | 2/2007 | Malloy et al. | 1/1 |
| 7,222,130 | B1 * | 5/2007 | Cras et al. | 707/803 |
| 7,302,421 | B2 * | 11/2007 | Aldridge | 707/2 |
| 7,533,369 | B2 * | 5/2009 | Sundararajan et al. | 717/123 |
| 7,793,207 | B2 * | 9/2010 | Ishizaki | 715/201 |
| 7,827,134 | B2 * | 11/2010 | Prang et al. | 707/602 |
| 7,945,597 | B2 * | 5/2011 | Cras et al. | 707/803 |
| 2003/0208460 | A1 * | 11/2003 | Srikant et al. | 707/1 |
| 2005/0039033 | A1 * | 2/2005 | Meyers et al. | 713/193 |
| 2005/0076045 | A1 * | 4/2005 | Stenslet et al. | 707/101 |
| 2005/0210052 | A1 * | 9/2005 | Aldridge | 707/101 |
| 2005/0216482 | A1 * | 9/2005 | Ponessa | 707/100 |
| 2005/0283488 | A1 * | 12/2005 | Colossi et al. | 707/100 |
| 2006/0010157 | A1 * | 1/2006 | Dumitrascu et al. | 707/102 |
| 2006/0293932 | A1 * | 12/2006 | Cash et al. | 705/7 |
| 2007/0027904 | A1 * | 2/2007 | Chow et al. | 707/102 |
| 2007/0061318 | A1 * | 3/2007 | Azizi et al. | 707/4 |
| 2007/0113221 | A1 * | 5/2007 | Liu et al. | 717/143 |
| 2007/0219957 | A1 * | 9/2007 | D'Hers et al. | 707/3 |
| 2007/0255741 | A1 * | 11/2007 | Geiger et al. | 707/101 |
| 2008/0005085 | A1 * | 1/2008 | Fujimaki | 707/3 |
| 2008/0040309 | A1 * | 2/2008 | Aldridge | 707/1 |
| 2008/0082495 | A1 * | 4/2008 | Polo-Malouvier et al. | 707/3 |
| 2008/0120323 | A1 * | 5/2008 | Etwaru et al. | 707/102 |

* cited by examiner

*Primary Examiner* — Wilson Lee
*Assistant Examiner* — Jessica N Le
(74) *Attorney, Agent, or Firm* — Samuel K. Simpson; Patent Ingenuity, P.C.

(57) ABSTRACT

A method and a system for analyzing a data value of interest in a multidimensional database. The data value of interest is first identified in a structured report. The data source for the structured report is retrieved. A context for the data value of interest in the data source is collected, for example, by extracting a slicer from the structured report, by extracting members of master-detail pages, or by extracting a default measure from the structured report. An analysis specification based on the collected context is then built, and the data value of interest is analyzed using the analysis specification. The result from analyzing the data value of interest may be presented in an analysis view.

22 Claims, 9 Drawing Sheets

| Revenue | | 2004 Q1 | 2005 Q1 | 2006 Q1 |
|---|---|---|---|---|
| Central Europe | Cooking Gear | $23,486.50 | $ 13,920.16 | $ 17,679.86 |
| | Sleeping Bags | $33,512.08 | $ 37,193.14 | $106,390.46 |
| | Packs | $35,946.80 | $ 75,543.98 | $109,763.58 |
| | Tents | $55,286.68 | **$170,637.78** | $ 97,541.04 |
| | Lanterns | $22,971.34 | $ 28,391.58 | $ 24,981.36 |

| Revenue | | 2004 Q1 | 2005 Q1 | 2006 Q1 |
|---|---|---|---|---|
| Central Europe | Cooking Gear | $23,486.50 | $ 13,920.16 | $ 17,679.86 |
| | Sleeping Bags | $33,512.08 | $ 37,193.14 | $106,390.46 |
| | Packs | $35,946.80 | $ 75,543.98 | $109,763.58 |
| | Tents | $55,286.68 | **$170,637.78** | $ 97,541.04 |
| | Lanterns | $22,971.34 | $ 28,391.58 | $ 24,981.36 |

600

| Revenue | | 2004 Q1 | 2005 Q1 | 2006 Q1 |
|---|---|---|---|---|
| Central Europe | Cooking Gear | $23,486.50 | $ 13,920.16 | $ 17,679.86 |
| | Sleeping Bags | $33,512.08 | $ 37,193.14 | $106,390.46 |
| | Packs | $35,946.80 | $ 75,543.98 | $109,763.58 |
| | Tents | $55,286.66 | **$170,637.78** | $ 97,541.04 |
| | Lanterns | $22,971.34 | $ 28,391.58 | $ 24,981.36 |

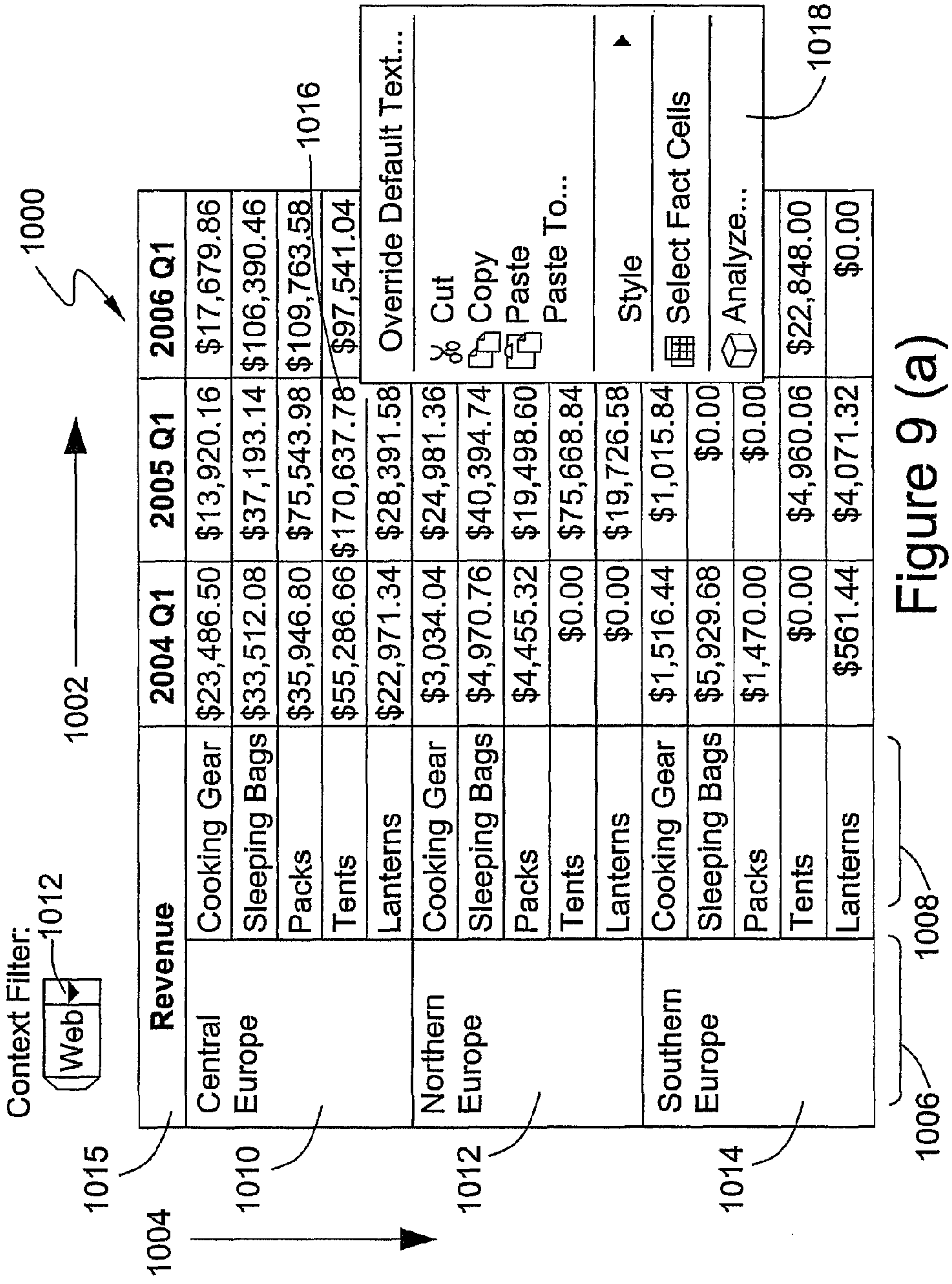

Figure 9 (a)

Context Filter: [Web]

| Revenue | | 2004 Q1 | 2005 Q1 | 2006 Q1 |
|---|---|---|---|---|
| Central Europe | Cooking Gear | $23,486.50 | $13,920.16 | $17,679.86 |
| | Sleeping Bags | $33,512.08 | $37,193.14 | $106,390.46 |
| | Packs | $35,946.80 | $75,543.98 | $109,763.58 |
| | Tents | $55,286.66 | $170,637.78 | $97,541.04 |
| | Lanterns | $22,971.34 | $28,391.58 | |
| Northern Europe | Cooking Gear | $3,034.04 | $24,981.36 | |
| | Sleeping Bags | $4,970.76 | $40,394.74 | |
| | Packs | $4,455.32 | $19,498.60 | |
| | Tents | $0.00 | $75,668.84 | |
| | Lanterns | $0.00 | $19,726.58 | |
| Southern Europe | Cooking Gear | $1,516.44 | $1,015.84 | |
| | Sleeping Bags | $5,929.68 | $0.00 | |
| | Packs | $1,470.00 | $0.00 | |
| | Tents | $0.00 | $4,960.06 | $22,848.00 |
| | Lanterns | $561.44 | $4,071.32 | $0.00 |

Pop-up menu:
- Override Default Text...
- Cut
- Copy
- Paste
- Paste To...
- Style ▲
- Select Fact Cells
- Analyze...

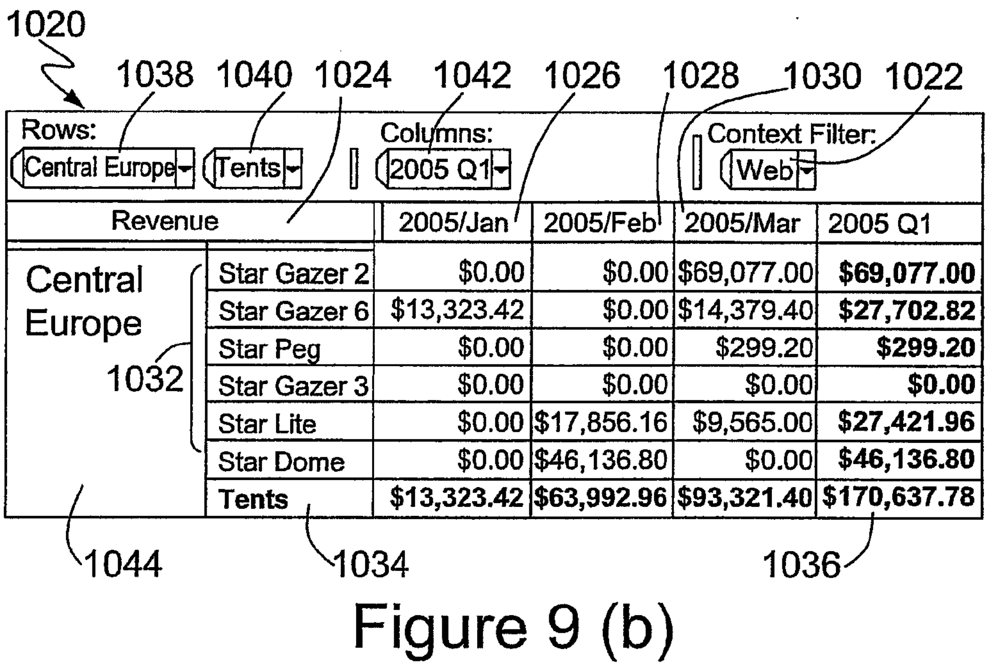

Figure 9 (b)

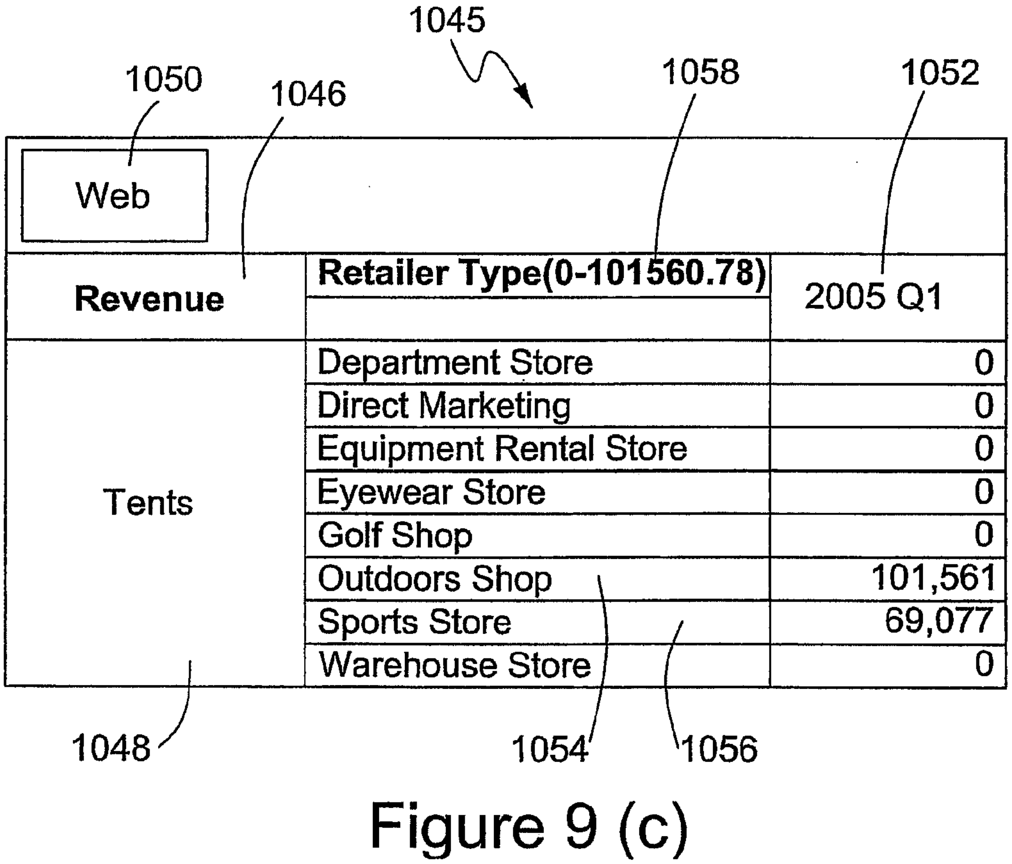

| Rows: | | | Columns: | | Context Filter: | |
|---|---|---|---|---|---|---|
| Central Europe ▼ | Tents ▼ | | 2005 Q1 ▼ | | Web ▼ | |

| Revenue | | 2005/Jan | 2005/Feb | 2005/Mar | 2005 Q1 |
|---|---|---|---|---|---|
| Central Europe | Star Gazer 2 | $0.00 | $0.00 | $69,077.00 | **$69,077.00** |
| | Star Gazer 6 | $13,323.42 | $0.00 | $14,379.40 | **$27,702.82** |
| | Star Peg | $0.00 | $0.00 | $299.20 | **$299.20** |
| | Star Gazer 3 | $0.00 | $0.00 | $0.00 | **$0.00** |
| | Star Lite | $0.00 | $17,856.16 | $9,565.00 | **$27,421.96** |
| | Star Dome | $0.00 | $46,136.80 | $0.00 | **$46,136.80** |
| | Tents | **$13,323.42** | **$63,992.96** | **$93,321.40** | **$170,637.78** |

Web

| Revenue | Retailer Type(0-101560.78) | 2005 Q1 |
|---|---|---|
| Tents | Department Store | 0 |
| | Direct Marketing | 0 |
| | Equipment Rental Store | 0 |
| | Eyewear Store | 0 |
| | Golf Shop | 0 |
| | Outdoors Shop | 101,561 |
| | Sports Store | 69,077 |
| | Warehouse Store | 0 |

SYSTEM AND METHOD FOR ANALYZING DATA IN A REPORT

FIELD OF THE INVENTION

The present invention relates to business intelligence data queries, more specifically, the present invention relates to a system and method for analyzing business intelligence data in a report.

BACKGROUND OF THE INVENTION

Business decision makers often use business intelligence analytical software to pose operational performance questions as queries against their data sources. The basic capabilities of querying and reporting functions is extended by Online Analytical Processing (OLAP). OLAP provides a number of key benefits that enable users to make more efficient managerial and strategic decisions by providing a robust multidimensional understanding of the data from a variety of perspectives and hierarchies in a multidimensional database. Business decision makers who require access to large amounts of data in order to make their business decisions are able to use OLAP to manipulate data quickly and effectively.

Exemplary analytical and navigational activities provided by OLAP include:

- calculations and modeling applied across dimensions, through hierarchies and/or across members;
- trend analysis;
- slicing subsets;
- drill-down to deeper dimensional levels of consolidation;
- drill-through to other detail data; and
- pivot to new dimensional comparisons.

Other OLAP functionality that provides insights into business growth, spending, and sales patterns includes operations for ranking, moving averages, growth rates, statistical analysis, and "what if" scenarios.

Multidimensional databases intuitively view data as a multidimensional structural metaphor called a cube whose cells correspond to events that occurred in the business domain. Each event is quantified by a set of measures; each edge of the cube corresponds to a relevant dimension for analysis, typically associated to a hierarchy of attributes that further describe it. A multidimensional database may further comprise a collection of related cubes. Dimensions, such as an essential and distinguishing concept in multidimensional databases, are used for selecting and aggregating data at the desired level of detail.

FIG. 1 (*a*) illustrates the conceptual structure of a multidimensional database 100. A dimension 102, 104, or 106 is a structural attribute that is a list of members, all of which are of a similar type in the user's perception of the data. For example, the year 2005 108 and all quarters, Q1 110, Q2 112, Q3 114, and Q4 116, are members of the Time dimension 102; the Outdoor 118, Environmental 120 and Sport 122 are members of the Product dimension 104; and Revenue 124, Cost 126 and Profit 128 are members of the Measures dimension 106. Moreover, each dimension 102, 104, or 106 is considered a member of the multidimensional database 100.

Within each dimension data can be organized into a hierarchy that represents levels of detail on the data. For example, within the time dimension 102, there may be levels for years, months, and days; a geography dimension may include: country, region, province, and city levels; and the product dimension may also include multiple levels, for example, category and product.

Hierarchies and levels of the dimensions typically display the same data in different formats such as time data can appear as months or quarters. Levels typically allow the data to be rolled-up into increasingly less detailed information such as in a geography dimension where cities roll-up into provinces which roll-up into counties and so forth.

FIG. 1 (*b*) illustrates the logical structure of a multidimensional database 130 arranged as a multidimensional array, or a cube, every data item in the multidimensional database 130 is located and accessed based on the intersection of the members of the dimensions 102, 104 and 106. The array comprises a group of data cells arranged by the dimensions 102, 104 and 106 of the data.

Cubes generally have hierarchies or formula-based relationships of data within each dimension. A dimension therefore acts as an index for identifying values within the cube. Dimensions offer a very concise, intuitive way of organizing and selecting data for retrieval, exploration and analysis. Current business intelligence analytical software enables the business decision makers to explore OLAP cubes on their own. The exploration of data may be facilitated by a structured report such as a cross tabulation, or cross-tab, on a user interface.

In the multidimensional database example 130 shown as a cube in FIG. 1 (*b*), the dimensions are Time 102, Product 104, and Measures 106. The cube is three dimensional, with each dimension represented by an edge axis of the cube. The intersection of the dimension members are represented by cells in the multidimensional database that specify a precise intersection along all dimensions that uniquely identifies a single data point. For example, the intersection of Q4 116, Revenue 124 and Environmental 120 contains the value, 132, representing the revenue for environmental products in the fourth quarter of 1997.

Dimensionality may be reduced by filtering a dimension to a single member, i.e. one dimension is held constant. If one member of the dimensions is selected, then the remaining dimensions in which a range of members, or all members are selected defining a sub-cube in which the number of dimensions is reduced by one. If all but two dimensions have a single member selected, the remaining two dimensions define a slice or a page. If all dimensions have a single member selected, then a single cell is defined.

Referring to FIG. 1 (*c*) a two-dimensional slice corresponding to data for Revenue 124 has been sliced from the Measure dimension 106 to generate a slice across that dimension.

A slicer is a set of members which generates a subset or a slice of the multidimensional cube.

Cubes generally have hierarchies or formula-based relationships of data within each dimension. Consolidation involves computing all of these data relationships for one or more dimensions. An example of consolidation is adding up all revenues in the first quarter. While such relationships are normally summations, any type of computational relationship or formula might be defined. In fact, there is no strict requirement to even have a relationship defined.

Members of a dimension are included in a calculation to produce a consolidated total for a parent member. Children may themselves be consolidated levels, which require that they in turn have children. A member may be a child for more than one parent, and a child's multiple parents may not necessarily be at the same hierarchical dimensional level, thereby allowing complex, multiple hierarchical aggregations within any dimension.

Drill-down to show more detail, roll-up to show less detail, pivot to change axis dimensions are currently available analytical techniques whereby the business decision maker navigates among dimensional levels of data ranging from the summarized to the detailed.

When data value of interest, for example, data which is outside a predictable pattern or a typical range, has been discovered, the prior art course of action is to drill-down into more details to get a breakdown of how a value is constituted based on lower-level members in a multidimensional hierarchy. If there are no lower-level members to drill to, the business decision makers may have the option to "drill-through" to an alternate exploration instance that might provide more detail about how the data value of interest resulted from its constituent parts. The drill-down and drill-through tasks typically require user experience. A user may have to experiment, using trial and error, with many possible data displays, before finding interesting exceptions. Therefore, the results of these data explorations may not be easily reproducible. To explore manually all the data values in the context of a multidimensional cube outside the drill path is not practical. A multidimensional database may include many dimensions, each with a hierarchy of many dimensional levels, with each dimensional level including hundreds of member data elements, any one of them may be data with special interest.

Drilling down to more details may provide some insight into which constituent members are contributing to the data value of interest, but may not pinpoint the causality in data values. Major influencers for the data value of interest could be on a specific data value in the context of a multidimensional cube, outside the drill path, i.e. not part of the dimensions making up the cross-tab, therefore the question of "why" is not answered completely.

In general, when a data value of interest is found in a structured report, for example, on a cross-tab, prior art does not provide a method to move to an analytical view of that data value of interest in real time.

The limitations to the drill-down and drill-though in a structured report are partially due to the fact that the reports, as presented to the user, are first created using a layout defined before data is added. A family of reports is usually set up by an administrator, and a drill-path is predefined from the start to the finish.

It is possible to defer the initial query of the data source used in the conventional reporting tools and methods until after the report has been defined, i.e. to use the analytic report for defining an automatically generated query. Once the report has been defined, the data to populate such a report is retrieved to build the document. This approach has been used, for example, in the "Impromptu™" family of products of Cognos Incorporated, the assignee of the present patent application. A brief description of the Impromptu products may be permanently retrieved at: http://web.archive.org/web/19991103193927/http://www.cognos.com/index.html, the contents of the document are incorporated hereby by reference in its entirety.

Another attempt has been made to convert data in a structured report to formulas provided in a spreadsheet, and place that data into arbitrary cells in a spreadsheet application. A report is built using functionality included in the spreadsheet application and a structured report before converting the report into a set of formulas. The user may use the structured report's field list to choose the categories of data to be included in the report However, prior art lacks the ability to seamlessly move from a report view of a structured report to an analysis view while retaining the dynamic context involved with defining a data value of interest, and performing a selected analysis on the data value of interest at the same time.

There is therefore a need to provide a user a system and a method to easily move from a data value of interest in a structured report to an analytical view of specific data without the loss of context fidelity.

There is a further need for a system and a method to perform analysis of the data value of interest before displaying the data to the user.

SUMMARY OF THE INVENTION

In accordance with an aspect of the present invention there is provided a method for analyzing a data value of interest in a multidimensional database, the method comprising the steps of: identifying the data value of interest in a structured report; retrieving a data source for the structured report; collecting a context for the data value of interest in the data source; building an analysis specification based on the collected context; and analyzing the data value of interest using the analysis specification.

Preferably, the method further comprises a step of presenting a result from analyzing the data value of interest in an analysis view.

Preferably, the step of collecting a context further comprises a step selected from a group consisting of: extracting a slicer from the structured report, extracting members of master-detail pages, extracting a default measure from the structured report, and a combination thereof.

Preferably, the method further comprises a step selected from a group consisting of: adding a member to the analysis specification, adding the children of an innermost nested member to the analysis specification, and a combination thereof.

Preferably, the structured report is a cross-tab and the data value of interest is an intersection in the cross-tab.

Preferably, the intersection has multiple columns or multiple rows.

Preferably, the analysis specification is explorer style or for driving factor analysis.

In accordance with another aspect of the present invention there is provided a system for analyzing a data value of interest in a multidimensional database, the system comprising: means for identifying the data value of interest in a structured report; means for retrieving a data source for the structured report; means for collecting a context for the data value of interest in the data source; means for building an analysis specification based on the collected context; and means for analyzing the data value of interest using the analysis specification.

In accordance with another aspect of the present invention there is provided a storage medium readable by a computer encoding a computer program for execution by the computer to carry out a method for analyzing a data value of interest in a multidimensional database, the computer program comprising: code means for identifying the data value of interest in a structured report; code means for retrieving a data source for the structured report; code means for collecting a context for the data value of interest in the data source; code means for building an analysis specification based on the collected context; and code means for analyzing the data value of interest using the analysis specification.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 (*b*) depicts a diagram for the logical structure of a multidimensional cube;

FIG. 1 (*c*) depicts a two-dimensional slice from a multidimensional cube;

FIG. 3 (*b*) shows a report client system;

FIG. 6 (*b*) depicts the influence of a data value of interest in a cross-tab;

FIG. 9 (*a*) is a screen capture showing a multidimensional cross-tab;

FIG. 9 (*b*) is a screen capture showing an analysis view according to one embodiment of the present invention; and FIG. 9 (*c*) shows an analysis view resulting from a driving factor analysis.

DETAILED DESCRIPTION OF PREFERRED EMBODIMENTS

Figure 1:
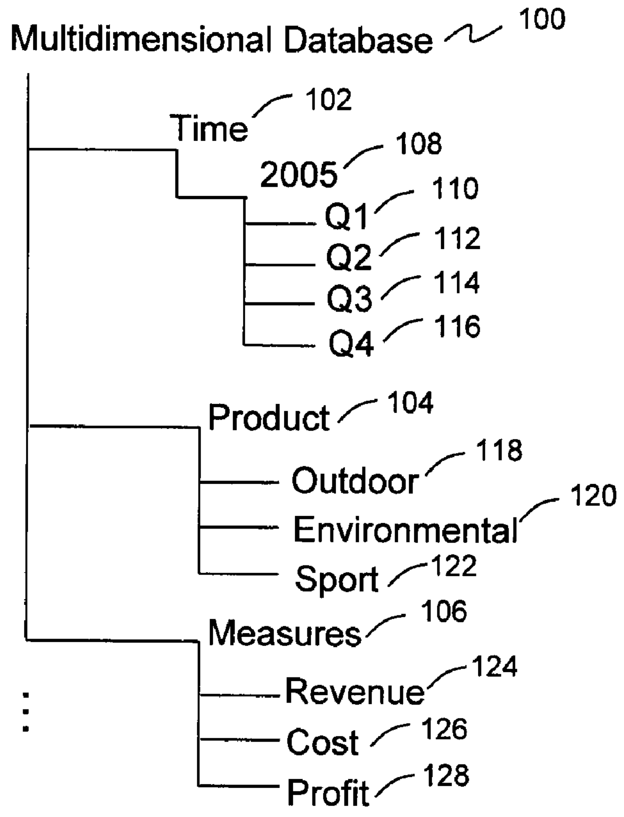
FIG. 1 (*a*) depicts a diagram of the conceptual structure of a multidimensional database.
Figure 1:
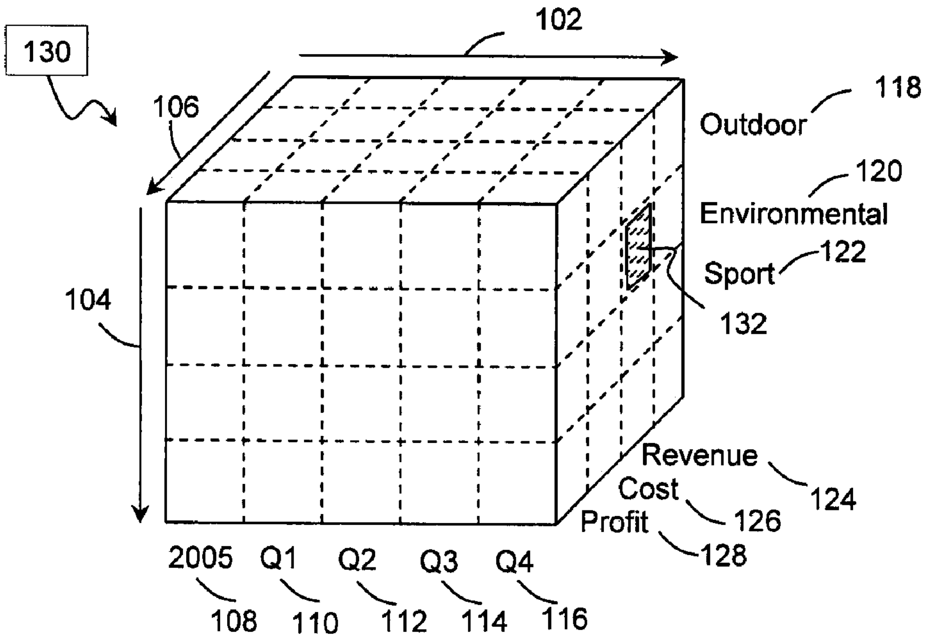
Figure 1:
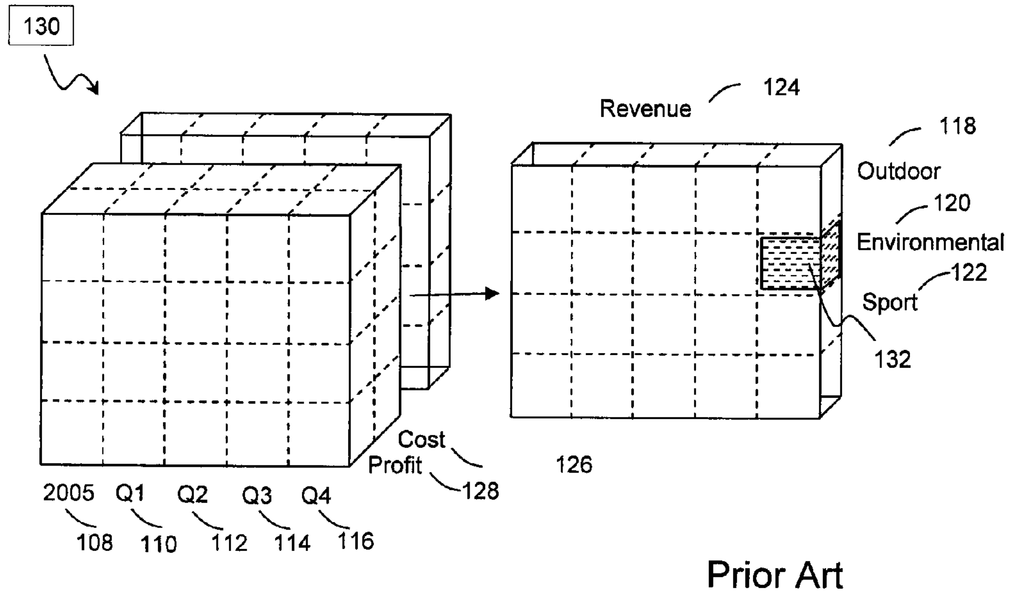

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

In this specification and the appended claims, the singular forms “a,” “an,” and “the” include plural references unless the context clearly dictates otherwise. Unless defined otherwise, all technical and scientific terms used herein have the same meaning as commonly understood to one of ordinary skill in the art to which this invention belongs.

The term “ancestor” is intended to describe a dimension value at any level above a particular value in a hierarchy. The ancestor value is the aggregated total of the values of its descendants. In the inheritance hierarchy of OLAP, an ancestor may also be an object that is two or more levels above a derived object.

The term “argument” is intended to describe a keyword, constant, or object name that provides input to a command, function, method, or program. An argument indicates the data values on which the command, function, method, or program operates; or specifies the operation of the command, function, method, or program.

The term “array” is intended to describe a group of data cells that are arranged by the dimensions of the data. A spreadsheet may be considered as a two-dimensional array in which the cells are arranged in rows and columns, with one dimension forming the rows and the other dimension forming the columns. Similarly, a three-dimensional array may be visualized as a cube with each dimension forming one edge of the cube.

An “attribute” is a descriptive characteristic of the elements of a dimension. Attributes represent logical groupings that allow users to select data based on like characteristics. For example, users might choose products using a Color attribute.

The term “cell” is intended to describe a data value identified by one value from each of the dimensions.

The term “child” is intended to describe a dimension value at the level immediately below a particular value in a hierarchy. Values of children are included in the calculation that produces the aggregated total for a parent. The dimension value may be a child for more than one parent if the dimension has more than one hierarchy. In the inheritance hierarchy of OLAP, a child may also be an object derived from another object.

A “cross-join” between a first set of members and a second set of members is a Cartesian product of the two sets, each member of the second set is enumerated for each member of the first set.

The term “cube” is intended to describe a logical organization of multidimensional data.

The term “descendant” is intended to describe a dimension value at any level below a particular value in a hierarchy. Values of descendants are included in the calculation that produces the aggregated total for an ancestor. In the inheritance hierarchy of OLAP, descendants may also be an object of two or more levels below another object, the ancestor.

The term “edge” is intended to describe one side of a cross-tab. Each edge contains values from one or more dimensions. Data organized for display purposes along three edges are referred to as the row edge, column edge, and page edge.

The term “fact” is intended to describe a focus of interest for the decision-making process; fact typically models a set of events occurring in the enterprise world.

The term “filter expression” is intended to describe a set expression that specifies criteria such that only members from the set expression that pass the criteria are returned from an associated query.

The term “hierarchy” is intended to describe a directed tree, rooted in a dimension, whose nodes are all the dimension tributes that describe that dimension, and whose arcs model many-to-one associations between pairs of dimension attributes. A hierarchy is a logical structure that uses ordered levels as a means of organizing and structuring dimension elements in parent-child relationships, with each level representing the aggregated total of the data from the level below.

The term “level” is intended to describe a position in a dimension hierarchy. Each level above the base level represents the aggregated total of the data from the level below. A level has constituent members. For example, a time dimension might have a hierarchy that represents data at the day, month, quarter, and year levels with 29, February, Q1 and 2000 as exemplary members.

The term “measure” is intended to describe a numerical property of a fact, and therefore the quantitative aspects of interests for analysis. A fact may also have no measures, resulting in a null value. A dimension is intended to describe a fact property with a finite domain and one of its analysis coordinates. The set of dimensions of a fact determines its finest representation granularity and is generally represented through a tuple. A tuple therefore conceptually describes the location of a cell in a multidimensional cube. The tuple of the values, one for each dimension, describes an occurrence of a fact in a multidimensional database.

The term "orthogonal axis" is intended to describe an axis, intersecting with the other axis in a cross-tab.

The term "orthogonal dimension" is intended to describe a dimension, intersecting with the other dimension in a multi-dimensional database.

The term "query" is intended to describe a specification for a particular set of data, the particular set of data is referred to as the query's result set. The specification may include intrinsic manipulation such as selecting, aggregating, calculating, or otherwise manipulating data.

The term "report" is intended to describe a presentation of multidimensional data. A report may be considered as an analysis tool that is used to view, manipulate, and print data.

The term "set expression" is intended to describe a collection of members from the same dimensional hierarchy, either explicitly specified, or generated by a multidimensional relationship function.

The term "slice" is intended to describe a subset of multi-dimensional data.

The term "slicer" is intended to describe a set of members which generate a subset or a slice of the multidimensional cube.

Figure 2:
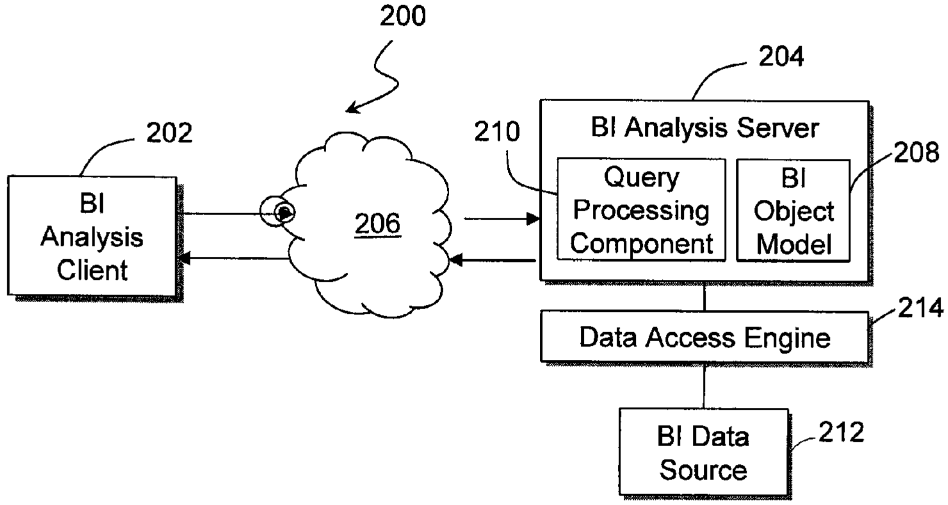
FIG. 2 is a block diagram showing a client-server architecture which performs business intelligence analysis.

FIG. 2 provides an overview of a business intelligence analysis client system 200 in accordance with an embodiment of the invention.

The business intelligence analysis client 202 communicates with a business intelligence analysis server 204 over a computer network 206, such as the Internet, an intranet and/or an extranet. The analysis server 204 has a business intelligence object model 208 and a query processing component 210. The object model 208 represents one or more underlying business intelligence data sources 212 storing business intelligence data. The query processing component 210 processes queries received from the analysis client 202 and retrieves requested data from the data sources 212 through the data access engine 214, using the object model 208.

Figure 3:
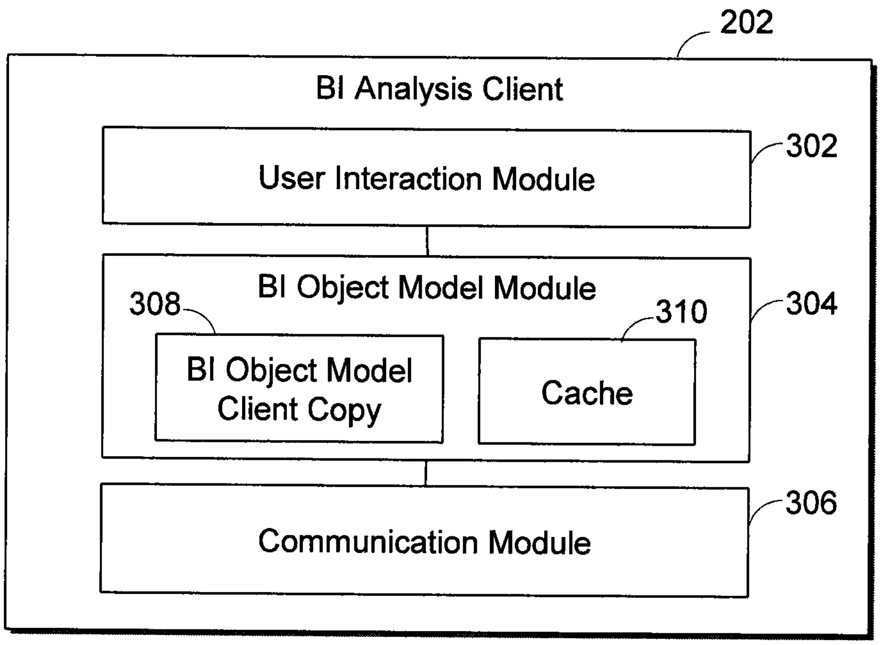
FIG. 3 (*a*) is a block diagram showing an embodiment of a business intelligence analysis client.
Figure 3:
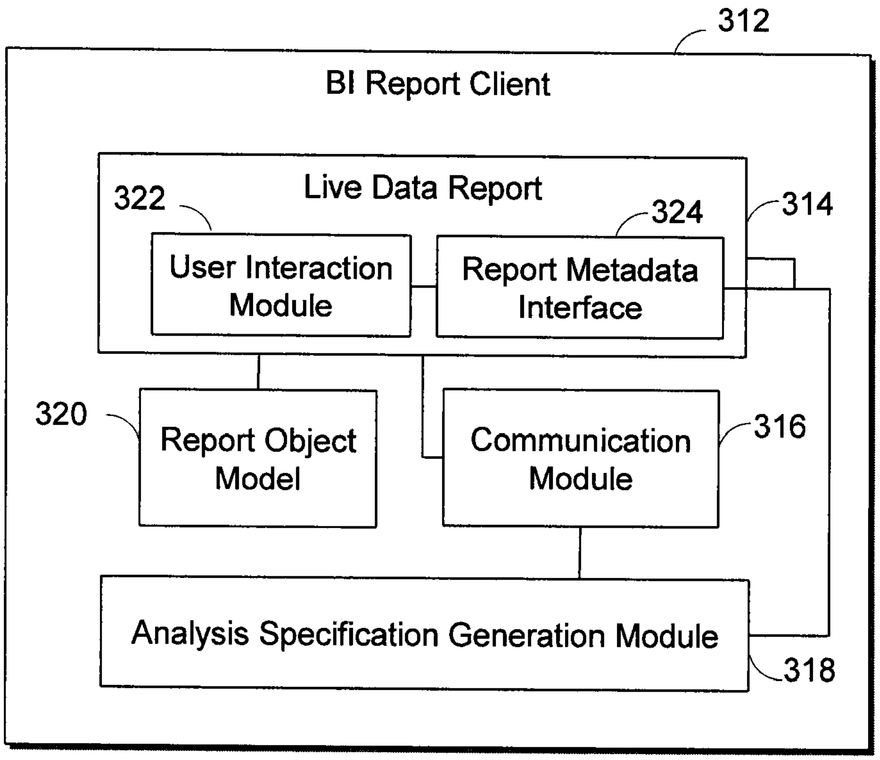

As shown in FIG. 3 (*a*), the analysis client system 202 has a user interaction module 302, a business intelligence object model module 304 and a communication module 306.

The user interaction module 302 manages user gestures through user interfaces, and converts the user gestures to requests comprising discreet commands for the object model module 304. For example, user gestures may include selecting, expanding or nesting data in a cross-tab. The user interaction module 302 also manages the rendering of the business intelligence objects for displaying responses to the user gestures.

The user interaction module 302 typically displays only a portion of the data available within the object model module 304, and may maintain a small copy of this data decorated to support efficient user interface activity.

The object model module 304 has a client copy 308 of the object model 208 of the analysis server 204. The object model client copy 308 stores model objects, which share a common definition with the analysis server 204. The analysis server 204 issues to the analysis client 202 commands to create, delete, replace or update objects in the object model client copy 308. For example, the analysis client 202 requests high level actions of the analysis server 204, such as drilling, expanding or nesting of data, and the analysis server 204 responds with object definitions and commands to modify the objects in the object model client copy 308. Thus, the analysis client 202 and analysis server 204 share a common business intelligence object model.

The object model module 304 may also manage a cache 310 of objects. It may perform intelligent look-ahead behavior.

The communications module 306 manages requests issued to, and responses received from the analysis server 204. The communications module 306 parses responses and directs them to the appropriate objects in the object model client copy 308.

FIG. 3(*b*) shows a report client system 312 including a live data report 314, a communication module 316 and an analysis specification generation module 318. The report client system 312 further includes a report object model 320. The live data report 314 further includes a user interaction module 322 which receives user inputs and interacts with a report metadata interface 324.

Figure 4:
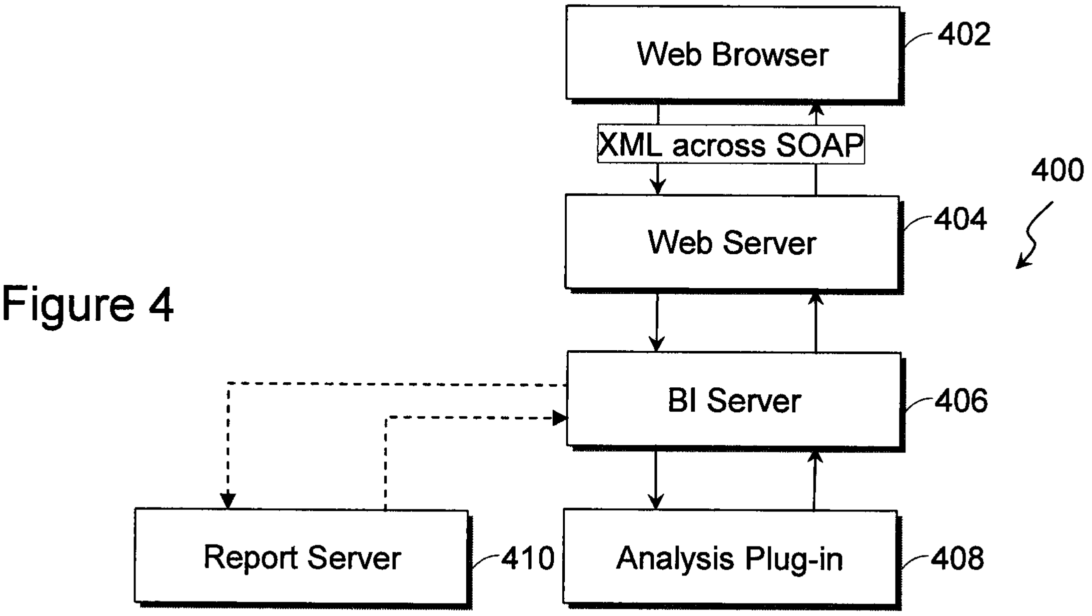
FIG. 4 is a block diagram showing an exemplary business intelligence analysis client-server system.
Figure 5:
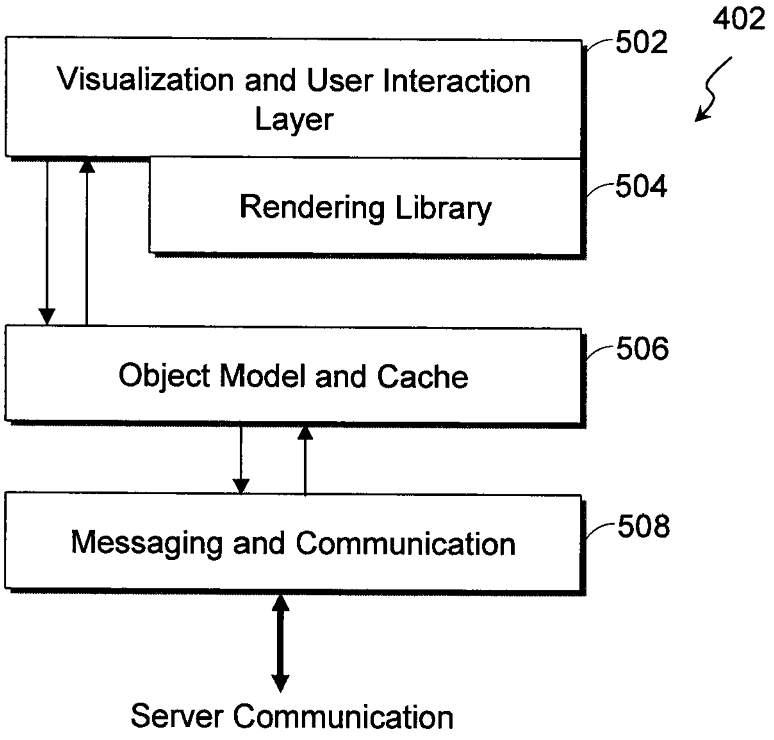
FIG. 5 is a block diagram showing the architecture of the Web browser based client.

Referring to FIGS. 4 and 5, an exemplary business intelligence analysis client-server system 400 using a Web browser 402 is described. In this embodiment, the analysis client 402 is Web browser based. The Web browser based client 402 communicates to a Web server 404, which communicates with a business intelligence server 406 over a computer network, such as the Internet, an intranet and/or extranet. The business intelligence server 406 has an analysis plug-in 408 for updating the server copy of the business intelligence object model, processing queries, retrieving data and preparing commands to update the client copy of the common business intelligence object model. The business intelligence server 406 may further have a report server 410 for updating the report object model.

FIG. 5 shows the architecture of the Web browser based client 402. The browser client 402 has a visualization and user interaction module or layer 502, an object model and cache module or layer 506 and a messaging and communication module or layer 508. These layers may provide similar functions as the user interaction module 302, business intelligence object model module 304 and communication module 306 shown in FIG. 3, respectively.

The visualization layer 502 has a rendering library 504 containing rendering elements, such as, menus, toolboxes, and cross-tabulation (cross-tabs).

The browser based client 402 may be written in javascript. The client-server interactions may use Extensible Markup Language (XML). The visualization of objects in the client may use Dynamic HTML (DHTML). The object model and cache layer 506 stores and manages the classes of objects, such as DataMatrix, MetadataSet, and FilterSet, which share a common definition with the business intelligence server 406.

The communications layer 508 manages Simple Object Access Protocol (SOAP) requests issued to and received from the business intelligence server analysis plug-in 408 via the Web server 404.

An example of the process flow between the components of the Web browser based client 402 and the business intelligence server 406 and analysis plug-in 408 is now described.

The visualization and user interaction layer 502 of the browser client 402 captures the user gestures. These gestures are converted to function calls into the object model layer 506.

The object model layer 506 then takes the function call and converts this to a business intelligence request to the web server 404. This request is formulated as an XML document and handed to the communication layer 508.

The communication layer 508 takes the XML document, wraps this into a SOAP request package, and then issues an HyperText Transfer Protocol (HTTP) request to the Web server 404 with this SOAP package. The communication layer 508 asynchronously monitors the progress of the request.

The Web server 404 sends the HTTP request to the business intelligence server 406 through the computer network.

The business intelligence server 406 receives the request and hands it to the analysis plug-in 408. The analysis plug-in 408 processes the request, queries the database as required, and creates an XML document containing the response. The XML document result describes updates to the common object model that is shared between the browser client 402 and the business intelligence server 406.

The communication layer 508 of the browser client 402 receives the HTTP response containing the SOAP response which includes the XML document describing the updates to the model in the object model layer 506. The communication layer 508 hands the XML document to the object model layer 506.

The object model layer 506 processes the XML response and updates the client or local copy of the model in the object model layer 506 with the changes identified by the business intelligence server analysis plug-in 408. The object model layer 506 notifies the visualization layer 502 about the changes to the objects of the model in the object model layer 506. The visualization layer 502 then completes the request pending state, and retrieves the new information from the object layer 506 and then updates the display, e.g., a tree and cross-tab, with the new information retrieved from the server as stored in the object layer 506 of the browser client 402.

The browser client 402 and the business intelligence server 406 are based on a client-server application program interface (API). The client-server API reflects well-defined separation of responsibilities between the browser client 402 and the business intelligence server 406. The API comprises a set of XML requests from the browser client 402 to the business intelligence server 406. In addition, there is a set of responses returned from the business intelligence server 406 to the browser client 402.

Figure 6:
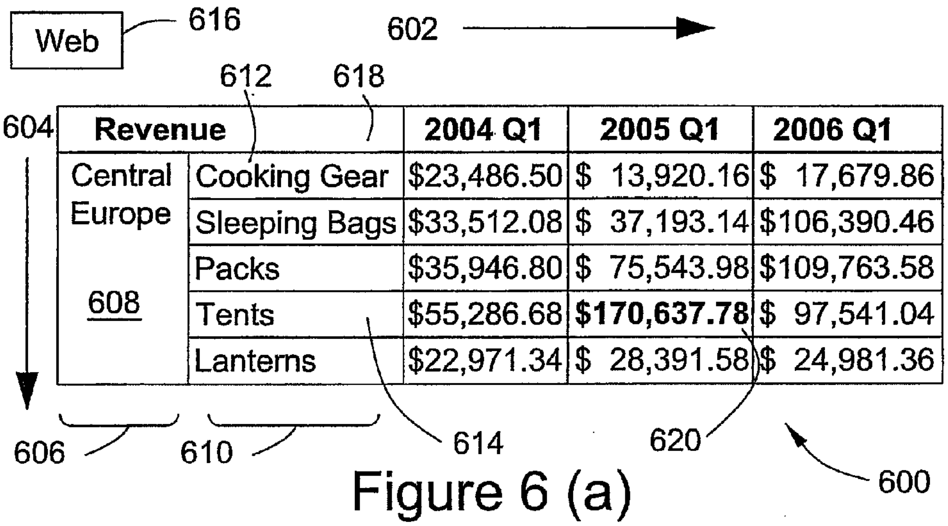
FIG. 6 (*a*) illustrates a multidimensional cross-tab having a time dimensional axis and a cross-joined axis.
Figure 6:
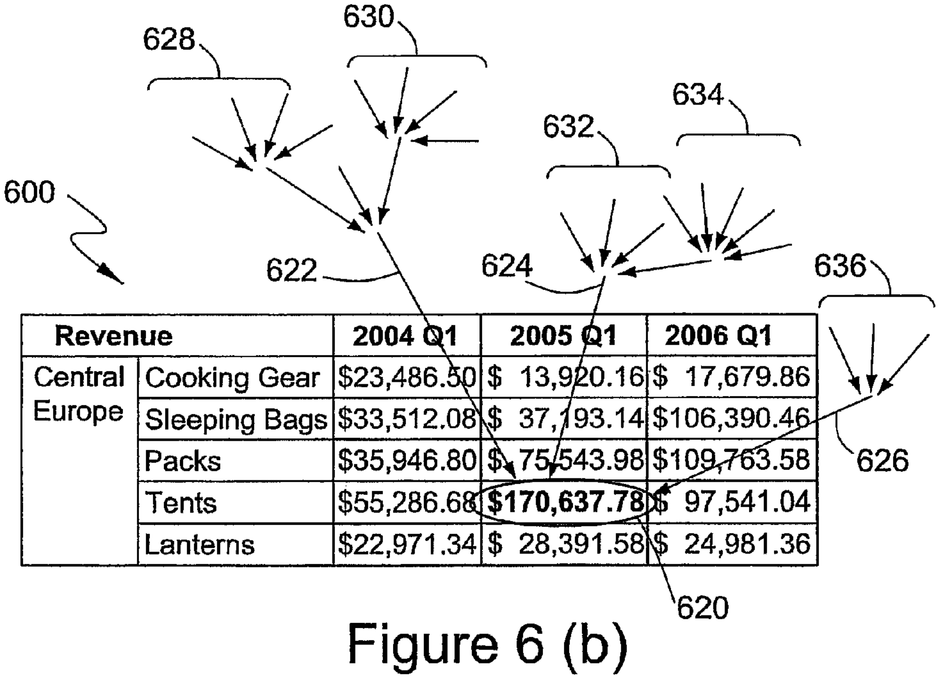

FIG. 6 (*a*) illustrates a multidimensional cross-tab 600 having a time dimensional axis 602 and an axis 604 with a cross-join, axis 604 is orthogonal to the time dimensional axis 602. Axis 602 may also be designated as column axis, while axis 604 is designated as row axis. In FIG. 6 (*a*), the cross-joined row axis 604 has a nested outer level 606 and an inner level 610. A nesting member set on an axis allows a user to visualize a cross-product of members from different dimensions. For example, for each product on the rows axis, a user could show the revenue for a certain region for each product, with columns showing the quarters. The cross-joined row axis 604 is the Cartesian product of the set 606 having a single location member of Central Europe 608; and the set 610 having the product members, Cooking Gears 612; Sleeping Bags, Packs, Tents 614, and Lanterns. The cross-join row axis 604 can be expressed as follows:

{Set (Central Europe)}×{Set (Cooking Gears, Sleeping Bags, Packs, Tents, Lanterns)}

In the above example, Set (Central Europe) forms the outer set expression, and the Set (Cooking Gears, Sleeping Bags, Packs, Tents, Lanterns) forms the inner set expression. It should be apparent to a person skilled in the art that an inner set may include further sets, which are inner sets relative to the first inner set.

The intersection of the dimensions contributes to the context of a data cell in a cross-tab. For example, data cell 620 is defined by the intersection of the location dimension ("Central Europe"), the product dimension ("Tents"), the time dimension ("2005 Q1") and the measure dimension ("Revenue").

The multidimensional cross-tab 600 may further include a slicer 616. A slicer is an additional filter that contributes to the context of the data cells in the cross-tab.

The slicer of the structured report, as represented by the cross-tab 600 may therefore include a member of the sale method dimension, namely "Web". The multidimensional cross-tab 600 may have a default measure, for example, Revenue 618 in the cross-tab 600.

When a user identifies a data value of interest 620, for example, the revenue for tents for the first quarter of the 2005 for central Europe in the cross-tab 600, which is outside a predictable pattern or a typical range, the user may wish to investigate this data value of interest 620 in more details in an analytical view.

As illustrated in FIG. 6 (*b*), the data value of interest 620 in the cross-tab 600 is influenced by different dimensions 622 624 626. Different members at different levels 628, 630, 632, 634, and 636 in turn influence the different dimensions 622 624 626. These dimensions with their influencing members collectively form the context for the data value of interest 620.

Figure 7:
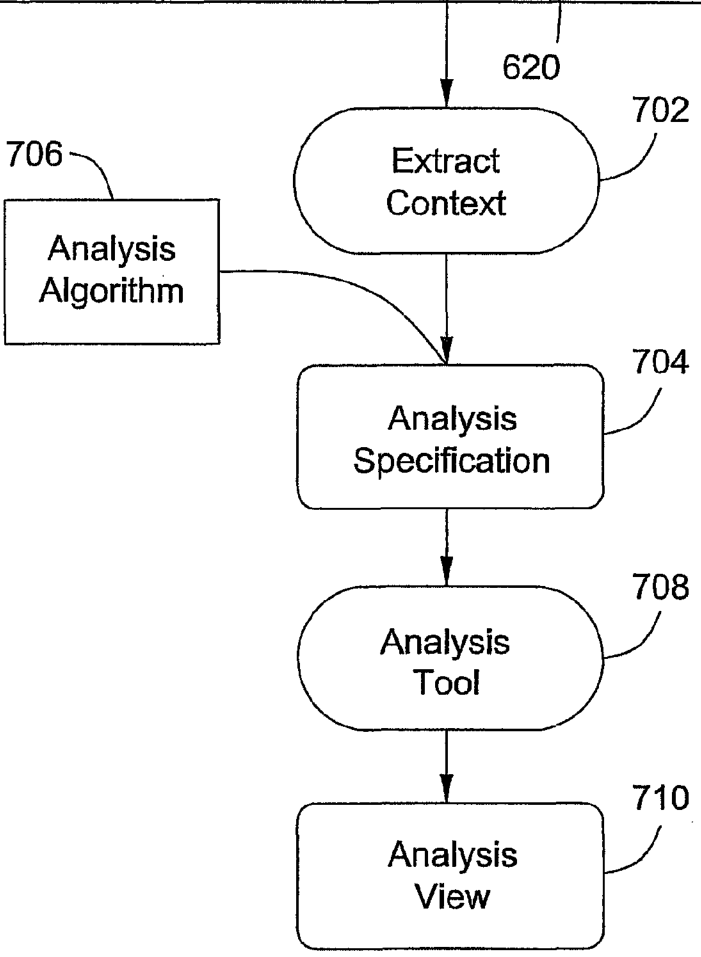
FIG. 7 shows the steps for producing an analysis view in accordance with one embodiment of the present invention.

Referring to FIG. 7, in accordance with one embodiment of the present invention, an intersection with data value of interest 620 is identified. The context is extracted 702 from the structured report, for example, the cross-tab 600. An analysis specification 704 is constructed based on the analysis algorithm 706. The analysis specification 704 is analyzed 708 and an analysis view 710 is produced. It should be apparent to a person skilled in the art that the analysis specification 704 is constructed based on the analysis algorithm 706, which in turn is based on the analysis tool 708 the user desires to perform on the intersection 620 of the cross-tab data, and displayed in the analysis view 710. Therefore, different business intelligence analysis algorithms may be applied here, for example but not limited to, general exploration style analysis, driving factor analysis, difference mining analysis, trend analysis, market basket analysis, and other statistical analyses.

Furthermore, once the analysis view is completed, the analysis view itself may be used as a report view to start another analysis of data value of interest.

Figure 8:
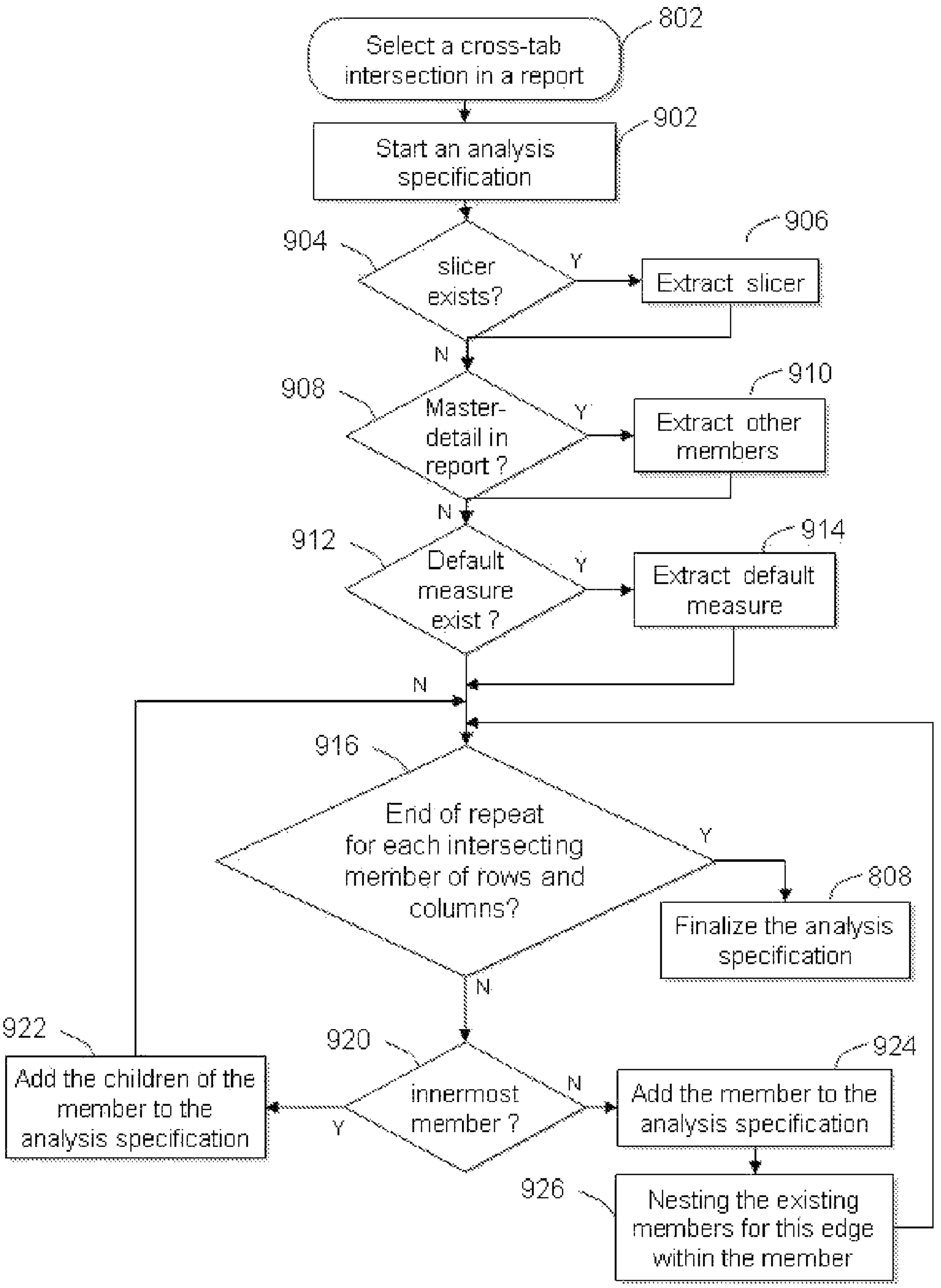
FIG. 8 describes two stages of the construction of an analysis specification in accordance with one embodiment of the present invention.

FIG. 8 describes two stages of the construction of an analysis specification 704 in accordance with one embodiment of the present invention. The first stage includes the steps for extracting the context for the data value of interest from the structured report. The second stage is an example of an exploration style analysis.

Referring to FIGS. 6 (*a*) and 8, starting with the selection of the data value of interest, for example, a cross-tab intersection in a structured report, after the data source 620 for the structured report is identified, an analysis specification is initialized 902. If the structured report has a slicer 616 904, the members from the slicer for the relevant queries are extracted, and added to the analysis specification 906. The current page of the cross-tab may include additional detailed pages in a master-detail relationship 908, additional members from the current page will then be extracted 910. If the cross-tab has a default measure 912, for example, the Revenue 618 in FIG. 6 (*a*), the default measure will be extracted 914.

In the example for an exploration style analysis, each intersecting member of the column and row of the intersection having the data value of interest 620 will be added to the analysis specification 916. If there are nested members, for the innermost member 920, the children of the member will be added to the analysis specification 922. For other nested members, i.e. not the innermost member, the member will be added to the analysis specification 924, and the existing members beneath the non-innermost nested member will be nested 926. This process will be repeated 916 until each intersecting member of rows and columns is processed, whereby the analysis specification, for this exploration style analysis, is finalized 808.

FIG. 9 (*a*) is a screen capture showing a multidimensional cross-tab similar to the cross-tab illustrated in FIG. 6 (*a*). FIG. 9 (*b*) is a screen capture showing an analysis view according to one embodiment of the present invention.

The cross-tab 1000 has a time dimensional axis 1002 and a cross-joined axis 1004. The cross-joined row axis 1004 is a nested axis having an outer level 1006 and an inner level 1008. The cross-joined row axis 1004 is the product of the set 1006 having the location members of Central Europe 1010, Northern Europe 1012, Southern Europe 1014; and the set 1008 having the product members, Cooking Gears; Sleeping Bags, Packs, Tents, and Lanterns. The cross-tab 1000 has a slicer entry "Web" indicating the order method. The cross-tab has a default measure Revenue 1015.

When, for example, a data value of interest 1016 is identified that shows a number that is unusually high, the user may be attempted to analyze this data value further.

At this point, an analysis specification is initiated that reflects all the constituent parts of the context in the report that is required to make up the number in question. In the example shown in FIGS. 9 (*a*) and (*b*), the slicer is added to the analysis specification, and reflected as a slicer 1022 in the analysis view 1020. The default measure Revenue 1015 in the original cross-tab is extracted from the context, added to the analysis specification and reflected in the analysis view 1020 as the default measure 1024.

As the axis 1004 in the cross-tab is nested, and the product members 1008 are the innermost members, the children 1032 (Star Gazer 2, Star Gazer 6, Star Peg, . . . ) of the member Tents 1034 are added to the analysis specification. The outer level "Central Europe" 1044 is then added and remains as the outer level. Similarly, the children 1026 1028 1030 of the member 2005 Q1 are added to the analysis specification.

An exploration style analysis that is consumed and displayed by an analysis program is capable of understanding the generated specification. For this style of analysis, the value in question appears as overall summary 1036 of the analysis view 1020. The set expressions in the analysis specification reflect the style of set expression that was being used in the reporting view while adding better visibility and access to advanced analysis tools. For example, the original cross-joined rows "Central Europe" 1038 "Tents" 1040 and the column "2005 Q1" 1042 now have the next level of details displayed.

Following is an example of the generated analysis specification:

```
<analysisReport schemaVersion="1.0">
    <blockPool>
        <childrenOfBlock name="x00000f2446eed91800000132">
            <member>
        [Great Outdoors Company].[Order Method].[Order
        Method].[Order Method1]->:[PC].[@MEMBER].[605]
        </member>
        </childrenOfBlock>
        <childrenOfBlock name="x00000f2446eed91800000137">
            <member>
        [Great Outdoors Company].[Products].[Products].[Product type]-
        >:[PC].[@MEMBER].[2]
        </member>
        </childrenOfBlock>
        <memberBlock name="x00000f2446eed9180000013c">
            <members>
                <member>
        [Great Outdoors Company].[Sales Territory].[Sales
        Territory].[Sales territory]->:[PC].[@MEMBER].[6199]
        </member>
            </members>
        </memberBlock>
        <childrenOfBlock name="x00000f2446eed91800000140">
            <member>
        [Great Outdoors Company].[Years].[Years].[Quarter]-
        >:[PC].[@MEMBER].[20050101-20050331]
        </member>
        </childrenOfBlock>
    </blockPool>
    <dataSource name="x00000f2446eed91800000124">
        <modelPath>/content/package[@name='Great Outdoors
Company']/model[@name='model']</modelPath>
    </dataSource>
    <filterSet name="x00000f2446eed91800000145">
        <blockFilter name="x00000f2446eed91800000146">
            <blockRef value="x00000f2446eed91800000132"/>
        </blockFilter>
    </filterSet>
    <dataMatrix name="x00000f2446eed91800000147"
refFilterSet="x00000f2446eed91800000145">
        <defaultMeasure>
            <measure>[Great Outdoors
Company].[Measures].[Revenue]</measure>
        </defaultMeasure>
        <rows>
            <axisExpr>
                <crossJoin>
                    <blockRef
                    value="x00000f2446eed9180000013c"/>
                    <blockRef
                    value="x00000f2446eed91800000137"/>
                </crossJoin>
            </axisExpr>
        </rows>
        <columns>
            <axisExpr>
                <blockRef value="x00000f2446eed91800000140"/>
            </axisExpr>
        </columns>
    </dataMatrix>
</analysisReport>
```

The same data value of interest may also be analysed using other analysis algorithms in accordance with the embodiments of the present invention, for example, by using the driving factor analysis as described in U.S. application Ser. No. 11/881,149, filed on Jul. 25, 2007, the entire contents of which are incorporated herein by reference.

Using the driving factor analysis, the data value of interest is assumed to have dimensional levels outside a drill path of the data value of interest which influence the data value of interest. Each of the dimensional levels has dimensional members. The dimensional levels are enumerated in a list. A dimensional level is selected from the list. A query is executed using the dimensional members of the dimensional level resulting in a set of query results. A variance of the set of query results is calculated. A driving factor is determined for the data value of interest based on the variance.

An exemplary analysis view resulting from a driving factor analysis of the data value of interest 1016 in the cross-tab

1000 is shown in FIG. 9 (*c*). In this example, the default measure Revenue 1046, the report slicer 1050, the row "Tents" and the column "2005 Q1" 1052 of the intersection in the original cross-tab are extracted and displayed. The members "Outdoors Shop" 1054 and "Sports Store" 1056 are members of the "Retailer Type" dimension 1058. The "Retailer Type" dimension 1058 was not visible or connected in the original cross-tab, and is identified through the driving factor analysis.

The analysis specification generated for the driving factors analysis is as following:

```
<analysisReport schemaVersion="1.0">
    <blockPool>
        <childrenOfBlock name="x00000f2446eed91800000132">
            <member>
        mun:[Great Outdoors Company].[Order Method].[Order
      Method].[Order Method1]->:[PC].[@MEMBER].[605]
      </member>
        </childrenOfBlock>
        <childrenOfBlock name="x00000f2446eed91800000189">
            <members>
                mun:[Great Outdoors
Company].[Products].[Products].[Product
type]->:[PC].[@MEMBER].[2]
            </members>
        </childrenOfBlock>
        <memberBlock name="x00000f2446eed9180000013c">
            <members>
                <member>
        [Great Outdoors Company].[Sales Territory].[Sales
      Territory].[Sales territory]->:[PC].[@MEMBER].[6199]
      </member>
            </members>
        </memberBlock>
        <memberBlock name="x00000f2446eed91800000140">
            <members>
                <member>
        [Great Outdoors Company].[Years].[Years].[Quarter]-
      >:[PC].[@MEMBER].[20050101-20050331]
      </member>
            </members>
        </memberBlock>
    </blockPool>
    <dataSource name="x00000f2446eed91800000124">
        <modelPath>/content/package[@name='Great Outdoors
Company']/model[@name='model']</modelPath>
    </dataSource>
    <dataMatrix name="x00000f2446eed91800000147">
        <analysis>
            <type>Driving Factors</type>
        </analysis>
        <context>
            <filterSet name="x00000f2446eed91800000145">
                <blockFilter name="x00000f2446eed91800000146">
                    <blockRef
                    value="x00000f2446eed91800000132"/>
                </blockFilter>
                <blockFilter name="x00000f2446eed918000004432">
                    <blockRef
                    value="x00000f2446eed9180000013c"/>
                </blockFilter>
            </filterSet>
            <defaultMeasure>
                <measure>[Great Outdoors
Company].[Measures].[Revenue]</measure>
            </defaultMeasure>
            <rows>
                <axisExpr>
                    <blockRef
                    value="x00000f2446eed91800000189"/>
                </axisExpr>
            </rows>
            <columns>
                <axisExpr>
                    <blockRef
                    value="x00000f2446eed91800000140"/>
```

-continued

```
                </axisExpr>
            </columns>
        </context>
    </dataMatrix>
</analysisReport>
```

Embodiments within the scope of the present invention can be implemented in digital electronic circuitry, or in computer hardware, firmware, software, or in combinations thereof. Apparatus within the scope of the present invention can be implemented in a computer program product tangibly embodied in a machine-readable storage device for execution by a programmable processor; and method actions within the scope of the present invention can be performed by a programmable processor executing a program of instructions to perform functions of the invention by operating on input data and generating output. Embodiments within the scope of the present invention may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present invention include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or a special-purpose computer system. Any of the foregoing can be supplemented by, or incorporated in, ASICs (application-specific integrated circuits). While particular embodiments of the present invention have been shown and described, changes and modifications may be made to such embodiments without departing from the true scope of the invention.

The present invention has been described with regard to one or more embodiments. However, it will be apparent to persons skilled in the art that a number of variations and modifications can be made without departing from the scope of the invention as defined in the claims.

What is claimed is:

1. A method comprising:

identifying a cross-tab intersection in a cross-tab;

retrieving a data source for a structured report;

collecting a context for the cross-tab intersection in the data source, wherein the context includes a data value;

building an analysis specification, with a processor, based on the collected context by extracting a slicer from the structured report and adding the slicer to the analysis specification based upon the structured report having said slicer, extracting a member of one or more master-detail pages and adding the one or more master-detail pages to the analysis specification based upon the structured report having one or more master-detail pages, extracting a default measure from the structured report and adding the default measure to the analysis specification based upon the structured report having a default measure, and adding at least one child of the member to the analysis specification based upon the member being an innermost nested member; and analyzing, with an analysis tool, the cross-tab intersection using the analysis specification.

2. The method of claim 1, further comprising presenting a result from analyzing the cross-tab intersection in an analysis view.

3. The method of claim 1, wherein the cross-tab intersection has multiple columns.

4. The method of claim 1, wherein the cross-tab intersection has multiple rows.

5. The method of claim 1, wherein the analysis specification is explorer style.

6. The method of claim 1, wherein the analysis specification is for driving factor analysis.

7. The method of claim 1, wherein the slicer is a set of members that generates a subset of a multidimensional cube.

8. A system comprising:

a processor configured to:

identify a cross-tab intersection in a cross-tab;

retrieve a data source for a structured report;

collect a context for the cross-tab intersection in the data source, wherein the context includes a data value;

build an analysis specification based on the collected context by extracting a slicer from the structured report and adding the slicer to the analysis specification based upon the structured report having said slicer, extracting a member of one or more master-detail pages and adding the one or more master-detail pages to the analysis specification based upon the structured report having one or more master-detail pages, extracting a default measure from the structured report and adding the default measure to the analysis specification based upon the structured report having a default measure, and adding at least one child of the member to the analysis specification based upon the member being an innermost nested member; and analyze, with an analysis tool, the cross-tab intersection using the analysis specification.

9. The system of claim 8, further comprising means for presenting a result from analyzing the cross tab intersection in an analysis view.

10. The system of claim 8, wherein the slicer is a set of members that generates a subset of a multidimensional cube.

11. The system of claim 8, wherein the cross-tab intersection has multiple columns.

12. The system of claim 8, wherein the cross-tab intersection has multiple rows.

13. The system of claim 8, wherein the analysis specification is explorer style.

14. The system of claim 8, wherein the analysis specification is for driving factor analysis.

15. A non-transitory storage medium readable by a computer encoding a computer program for execution by the computer to carry out a method for analyzing a data value of interest in a multidimensional database comprising:

identifying a cross-tab intersection in a cross-tab;

retrieving a data source for a structured report;

collecting a context for the cross-tab intersection in the data source, wherein the context includes a data value;

building an analysis specification based on the collected context by extracting a slicer from the structured report and adding the slicer to the analysis specification based upon the structured report having said slicer, extracting a member of one or more master-detail pages and adding the one or more master-detail pages to the analysis specification based upon the structured report having one or more master-detail pages, extracting a default measure from the structured report and adding the default measure to the analysis specification based upon the structured report having a default measure, and adding at least one child of the member to the analysis specification based upon the member being an innermost nested member; and analyzing, with an analysis tool, the cross-tab intersection using the analysis specification.

16. The non-transitory storage medium of claim 15, further comprising means for presenting a result from analyzing the cross-tab intersection in an analysis view.

17. The non-transitory storage medium of claim 15, wherein the slicer is a set of members that generates a subset of a multidimensional cube.

18. The non-transitory storage medium of claim 15, wherein the method further comprises presenting a result from analyzing the cross-tab intersection in an analysis view.

19. The non-transitory storage medium of claim 15, wherein the cross-tab intersection has multiple columns.

20. The non-transitory storage medium of claim 15, wherein the cross-tab intersection has multiple rows.

21. The non-transitory storage medium of claim 15, wherein the analysis specification is explorer style.

22. The non-transitory storage medium of claim 15, wherein the analysis specification is for driving factor analysis.

* * * * *